Patented Oct. 21, 1930

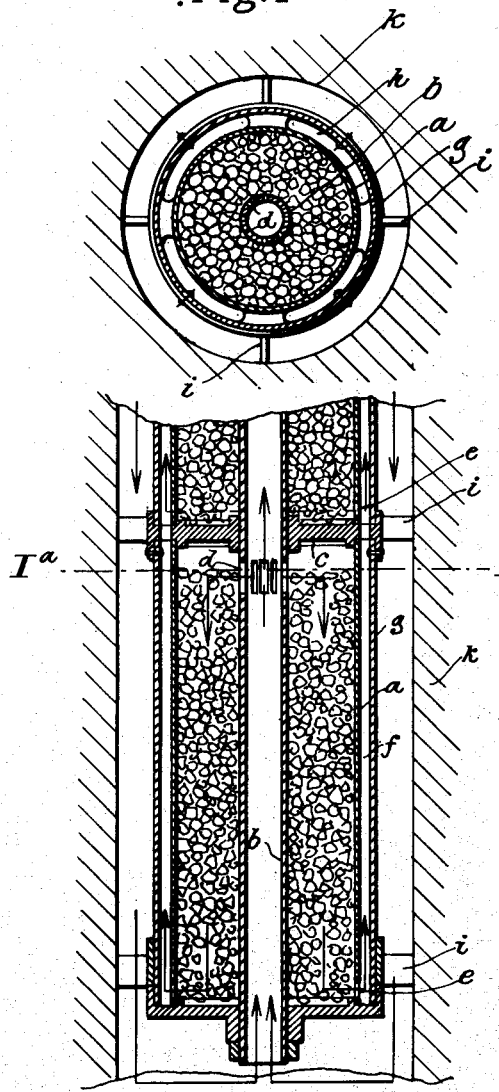
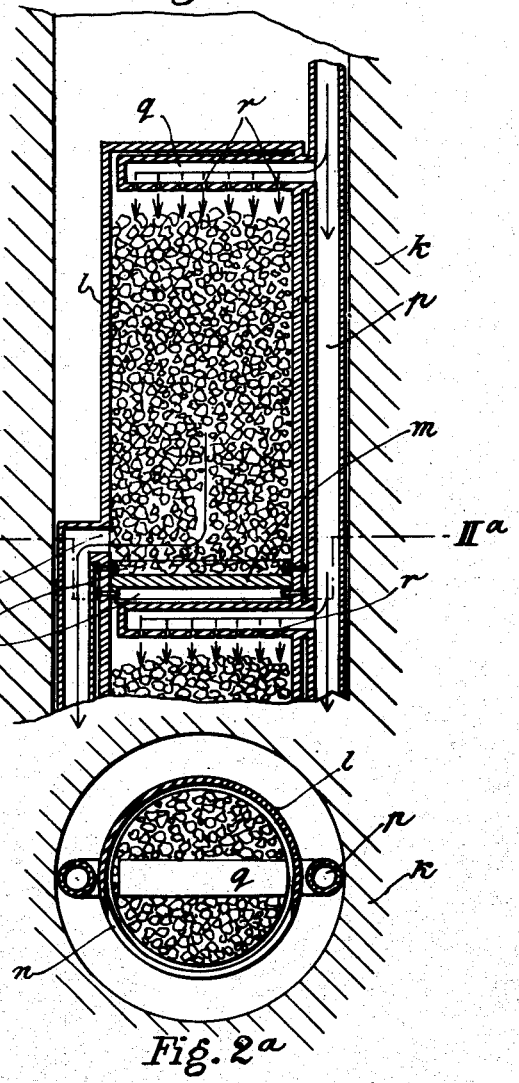

1,779,092

UNITED STATES PATENT OFFICE

HANS HARTER, OF WURZBURG, GERMANY

APPARATUS FOR CARRYING OUT EXOTHERMIC CATALYTIC GAS REACTIONS

Original application filed July 9, 1927, Serial No. 204,649, and in Germany August 10, 1926. Divided and this application filed July 9, 1928. Serial No. 291,302.

This application is a division of my application Serial No. 204,649 filed July 9th, 1927.

This invention relates to exothermic catalytic gas reactions, especially to the synthesis of ammonia from its elements and to processes of oxidation such as the combustion of ammonia to nitric acid. The object of the invention is to enable the use of large and efficient catalytic apparatus in which the reaction is distributed as uniformly as possible over the whole catalyst and local overheating is avoided. This object is obtained, according to my invention, by subdividing the gas current supplied to each single apparatus into a number of single currents which enter the catalyst at different points, or pass through several divisions of the catalytic material. In some cases the reaction may further be moderated by supplying the gas or gases under increased pressure or liquefied, and cooling them down by releasing the pressure during the introduction or by introducing, besides the gases needed for the reaction, other liquefied or compressed gases and releasing the pressure during the introduction or in the reaction chamber.

When making ammonia the cooling medium may be liquid ammonia which in this case is directly withdrawn from the condenser of the high-pressure apparatus; in some cases compressed or liquid oxygen or a compressed or liquefied nitrogen-hydrogen mixture may be used. These media may be preferably added to the reacting gas mixture in the moment of reducing the pressure of the latter to the working pressure in the condenser in front of the catalytic apparatus.

Two embodiments of my invention are illustrated in the accompanying drawings, of which Fig. 1 is a partial longitudinal section and Fig. 1ª is a cross-section of a catalytic tube.

Figs. 2 and 2ª show a modified form of the catalytic tube in longitudinal and cross-section respectively.

Fig. 1 shows the head of a catalytic tube in longitudinal section, and Fig. 1ª a cross-section through the said tube. The catalytic material is contained in a thin-walled pipe $a$, in the axis of which the gas introducing pipe $b$ is placed. The annular space filled with catalytic material is divided by partitions $c$ into separate chambers at certain distances. Slots $d$ provided in the pipe $b$ at distances equal to those between the partitions $c$ connect the pipe $b$ with the different chambers. After reaction the gases leave each chamber through openings $e$ in the pipe $a$ and are withdrawn by an annular channel $f$ formed between the tube $a$ and a wider tube $g$. The partitions $c$ are interrupted by bow-shaped slots $h$ to allow the passage of the gases.

The tube $g$ including its contents is supported by a spider $i$ in the pressure pipe $k$. The fresh gas passes through the annular space between the tubes $k$ and $g$, then through the supporting spider $i$ and hence it enters the bottom end of pipe $b$.

Figs. 2 and 2ª show in longitudinal and cross-section respectively a catalytic tube the interior of which is likewise divided into separate chambers. Fig. 2ª is a cross-section through the line IIª—IIª of Fig. 2, the slide being removed. The catalytic material is contained in the tube $l$ which is divided into separate comparements by slides $m$. For this purpose slots $n$ are out into the tube $l$ at certain distances extending over half the circumference of the tube $l$. The slots $n$ are confined by rings $o$ riveted into the tube $l$, and the slides $m$ may be pushed in from without. Between the tube $l$ and the pressure tube $k$ the gas inlet pipe $p$ is placed from which a tubulure $q$ closed at its end branches off to each division of tube $l$ said tubulure being perforated in the catalytic chamber by a number of holes *r*. The outlet *s* for the products of reaction is placed at the opposite end.

I claim:—

1. An improved apparatus for carrying out exothermic catalytic gas reactions, comprising a pressure-sustaining tube of considerable length enclosing a plurality of elongated reaction chambers having nearly the same cross-section as the said tube and being arranged in a continuous row, and means for distributing the reagent gases over and withdrawing the reaction products from the said chambers in parallel.

2. An apparatus in accordance with claim 1 in which the collecting gas conduit surrounds the reaction chambers.

In testimony whereof I affix my signature.

HANS HARTER.